United States Patent [19]

Bracken et al.

[11] Patent Number: 5,666,236
[45] Date of Patent: Sep. 9, 1997

[54] VELOCITY CONTROL FOR A DISK DRIVE ACTUATOR

[75] Inventors: Allen Thomas Bracken, Layton; Edward L. Rich; Harold Lin Woods, both of Ogden; Hong Tan, Layton, all of Utah

[73] Assignee: Iomega Corporation, Roy, Utah

[21] Appl. No.: 517,836

[22] Filed: Aug. 22, 1995

[51] Int. Cl.$^6$ .................................................. G11B 21/02
[52] U.S. Cl. .................. 360/75; 360/78.11; 360/77.03; 360/78.06
[58] Field of Search .................. 360/133, 78.11, 360/77.03, 78.06, 78.07, 75; 369/43; 356/27, 28, 29, 375

[56] References Cited

U.S. PATENT DOCUMENTS

| | | | |
|---|---|---|---|
| 4,096,579 | 6/1978 | Black et al. | 364/900 |
| 4,558,383 | 12/1985 | Johnson | 360/135 |
| 4,691,152 | 9/1987 | Ell et al. | 318/616 |
| 4,864,437 | 9/1989 | Couse et al. | 360/75 |
| 4,905,107 | 2/1990 | Klein | 360/75 |
| 4,920,462 | 4/1990 | Couse et al. | 360/78.04 |
| 5,056,072 | 10/1991 | Wachi | 369/32 |
| 5,065,262 | 11/1991 | Blackborow | 360/77.03 |
| 5,084,791 | 1/1992 | Thanos et al. | 360/77.04 |
| 5,090,002 | 2/1992 | Chow et al. | 369/44.28 |
| 5,128,813 | 7/1992 | Lee | 360/78.07 |
| 5,276,569 | 1/1994 | Even | 360/73.02 |
| 5,323,286 | 6/1994 | Faul | 360/137 |
| 5,325,349 | 6/1994 | Taniguchi | 360/77.03 |

FOREIGN PATENT DOCUMENTS

| | | | |
|---|---|---|---|
| 292470 | 11/1988 | Japan | 360/78.11 |
| 251480 | 10/1989 | Japan | 360/77.03 |

*Primary Examiner*—Aristotelis M. Psitos
*Assistant Examiner*—Alan Faber
*Attorney, Agent, or Firm*—Woodcock, Washburn, Kurtz, Mackiewicz & Norris LLP

[57] ABSTRACT

A data storage device for reading and writing information to and from a storage medium and having an actuator for moving a read/write head over a surface of the storage medium comprises an optical sensor mounted on either a surface of the data storage device or a surface of the actuator, and a gray-scale pattern provided on the other of these surfaces, opposite the optical sensor. The gray scale pattern provides an amount of reflected light at the optical sensor that varies with the position of the actuator. The optical sensor receives the reflected light and generates therefrom an output signal indicative of the position of the actuator. A control system processes the position signal output from the optical sensor for controlling the velocity of the actuator.

53 Claims, 8 Drawing Sheets

VELOCITY CONTROL FOR A DISK DRIVE ACTUATOR

BACKGROUND

1. Field of the Invention

The present invention relates to a data storage device having read/write heads for accessing information on a storage medium, and more specifically, to a mechanism for controlling the velocity of an actuator that moves the read/write heads in relation to the storage medium, particularly during head loading operations.

2. Description of the Prior Art

Data storage devices, and in particular, data storage devices of the type that accept a removable cartridge containing a disk-shaped storage medium, usually employ either a linear actuator mechanism or a rotary arm actuator mechanism for positioning the read/write head(s) of the disk drive over successive tracks of the disk-shaped storage medium. In most disk drives, and particularly in those that receive removable disk cartridges, the linear or rotary arm actuators are moved to a retracted, or parked position when the disk drive is not in use. In such a retracted position, the read/write heads of the disk drive are moved off and away from the surface(s) of the storage medium in order to prevent damage to the head(s) and storage medium. In order to resume use of the disk drive, the read/write heads must once again be loaded onto the surface(s) of the storage medium so that the data transfer can begin. It is important that the head loading operation be carried out in a controlled manner to prevent damage to the read/write heads.

Couse et al., U.S. Pat. No. 4,864,437, describe a head loading velocity control mechanism for a disk drive that measures the back EMF voltage across the actuator of the disk drive to obtain an indication of the velocity of the actuator. The measured back EMF voltage is then employed in a control scheme to control the velocity of the actuator during a head loading operation. Unfortunately, the circuitry needed to measure the back EMF voltage across the actuator increases the cost and complexity of the disk drive. Furthermore, this technique provides only a rough control of the actuator velocity, which may not be acceptable in many applications.

Lee, U.S. Pat. No. 5,128,813, describes a velocity control technique for a disk drive actuator that employs thermal measurements to estimate the velocity of the actuator. Again, however, the circuitry necessary to obtain accurate thermal measurements unduly increases the cost of the disk drive, and this technique is susceptible to inaccuracies.

Other prior art devices employ high-precision glass scales affixed to a disk drive actuator for obtaining accurate position and track counting information during track seek operations. See, e.g., Thanos et al., U.S. Pat. No. 5,084,791. Unfortunately, the cost and complexity of the high-precision glass scales and associated optical circuitry make them disadvantageous.

Certain products in the "BETA" line of Bernoulli disk drives manufactured by Iomega Corporation, the assignee of the present invention, employ an optical sensor and a gray-scale pattern affixed to a linear drive actuator to obtain an indication of the linear position of the actuator. However, these products do not, and are not capable of, deriving or controlling the velocity of the actuator using the position information generated with the gray-scale pattern and optical sensor.

As the foregoing illustrates, there is a need for a simple, cost efficient mechanism for controlling the velocity of a disk drive actuator, particularly during head loading operations. The present invention satisfies this need.

SUMMARY OF THE INVENTION

The present invention is directed to a simple, low-cost, efficient means of controlling the velocity of an actuator of a data storage device, particularly during head loading operations. According to the present invention, a data storage device for reading and writing information to and from a storage medium and having an actuator for moving a read/write head over a surface of the storage medium comprises an optical sensor mounted on either a surface of the data storage device or a surface of the actuator, and a gray-scale pattern provided on the other of these surfaces opposite the optical sensor. The gray scale pattern provides an amount of reflected light at the optical sensor that varies with the position of the actuator. The optical sensor receives the reflected light and generates therefrom an output signal indicative of the position of the actuator. A control system processes the position signal output from the optical sensor in accordance with a velocity control algorithm to control the velocity of the actuator, particularly during a head loading operation. The optical sensor and gray-scale pattern provide a simple, low-cost, efficient means of generating a signal indicative of the position of the actuator arm, from which the control system can derive a velocity estimate and control the velocity of the actuator arm.

These and other features and advantages of the present invention will become evident hereinafter.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings.

DETAILED DESCRIPTION OF THE PREFERRED EMBODIMENT

Figure 1:
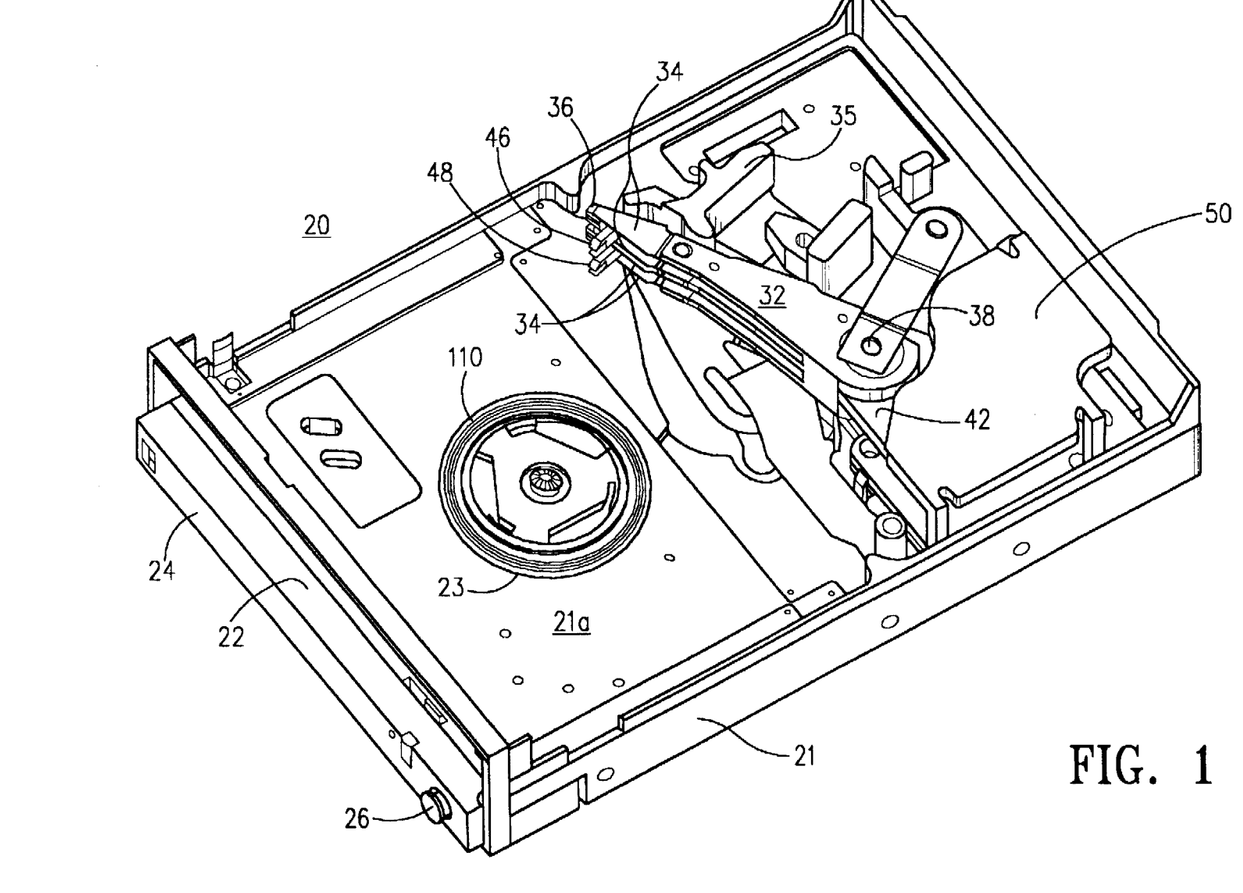
FIG. 1 is a perspective view of a data storage device, or disk drive, in which the present invention may be employed.

Referring to the drawings wherein like numerals indicate like elements throughout, there is shown in FIG. 1 an exemplary data storage device 20, or disk drive, in which the present invention may be employed. The exemplary disk drive 20 is of the type that receives a removable disk cartridge, however, the present invention is by no means limited thereto. For example, the present invention can also be employed in a fixed-disk type drive.

Figure 2:
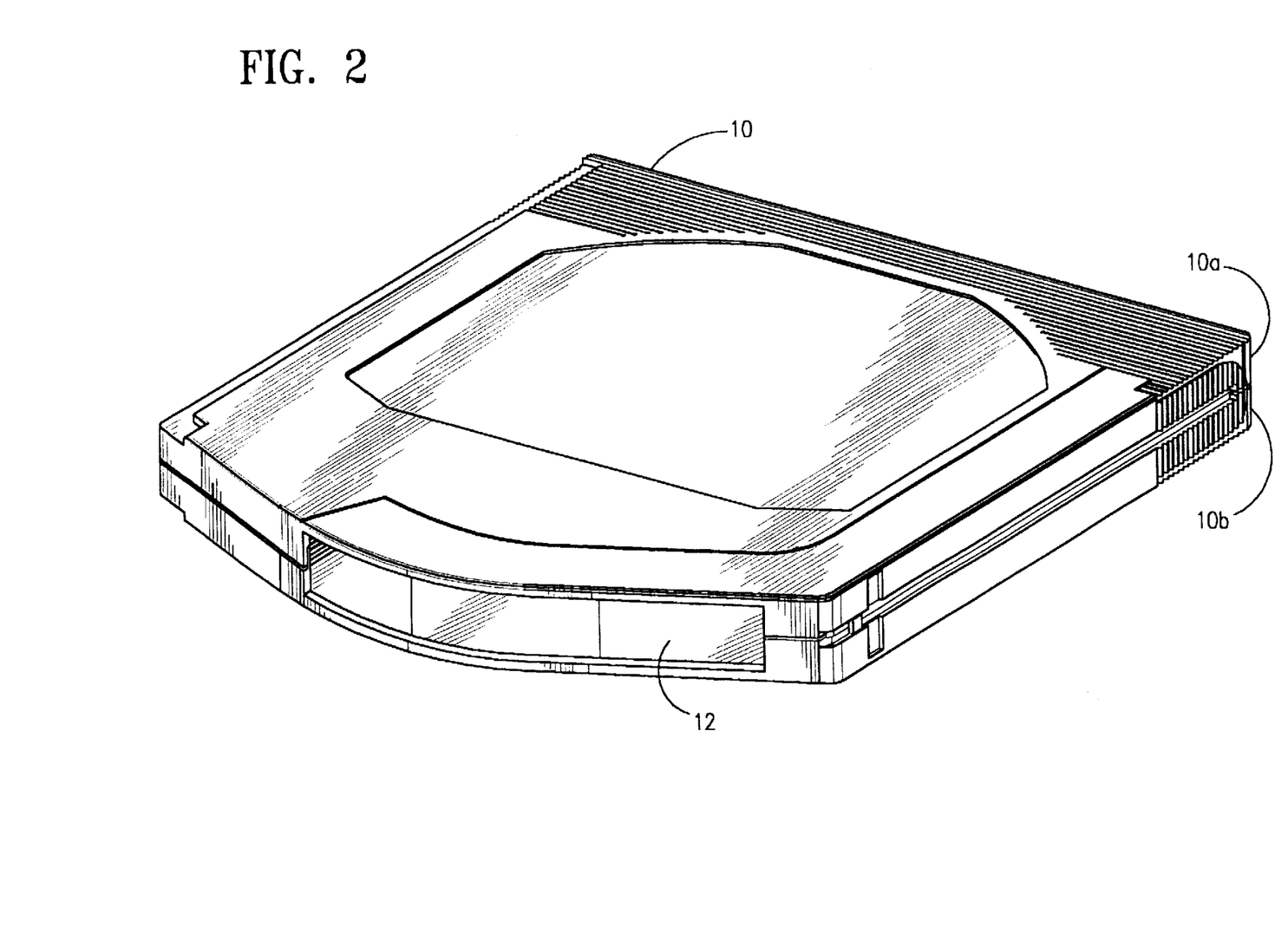
FIG. 2 is a perspective view of a disk cartridge for use in connection with the disk drive of FIG. 1.

As shown in FIG. 1, the exemplary disk drive 20 comprises a chassis 21 on which a number of disk drive components are mounted. A front panel 24 of the disk drive 20 has a substantially horizontal opening 22 for receiving a removable disk cartridge (FIG. 2). An eject button 26 is provided on the front panel for ejecting a disk cartridge from the disk drive 20. A spindle motor 110 is mounted on the chassis 21 to provide a means for rotating the storage media within a disk cartridge.

An actuator arm 32, which forms part of a rotary arm voice coil actuator, is pivotally mounted to the drive chassis 21 at 38. The actuator arm 32 has a plurality of suspension arms 34 at its distal end that each carry a respective read/write head 36 for recording and reading information to and from the surfaces of the storage media of a disk cartridge. A head loading mechanism 35 facilitates loading of the magnetic heads onto the storage media. The head loading mechanism comprises a pair of load ramp structures 46, 48 upon which the suspension arms 34 of the actuator arm 32 ride during head loading/unloading operations. Further details concerning a head loading mechanism of the type shown at 35 can be found in co-pending, commonly assigned, U.S. patent application Ser. No. 08/438,254, entitled "Head Loading Mechanism for a Disk Drive," filed May 10, 1995, which is incorporated herein by reference in its entirety.

A voice coil element 43 (FIGS. 3 and 5) is affixed to a forked member 42 at the other end of the actuator arm 32 for controlling the rotational movement of the arm 32. A magnet return path assembly 50 is mounted to the chassis 21 and provides a magnet return path for the voice coil element 43.

FIG. 2 is a perspective view of a disk cartridge 10 that may be used with the removable cartridge disk drive 20 of FIG. 1. The disk cartridge 10 comprises an outer casing consisting of upper and lower shells 10a, 10b, respectively. Preferably, the upper and lower shells 10a, 10b are formed of a rigid plastic material. In the present embodiment, the disk cartridge 10 contains two disk-shaped storage mediums 60, 62 (FIG. 7) that are attached, in stacked relation, to a hub assembly (not shown) rotatably mounted within the outer casing. A door 12 on the casing provides access to the recording disks by the read/write heads of a disk drive. In the present embodiment, the storage media comprise rigid magnetic media, however, other storage media may be employed, such as flexible magnetic media or optical media. As described hereinafter in greater detail, when the disk cartridge 10 is inserted into the disk drive 20, the actuator arm 32 will rotate counter-clockwise (as viewed in FIG. 1) causing the suspension arms 34 of the actuator to move off the load ramp structures 46, 48, thereby loading the read/write heads 36 onto the surfaces of the storage media 60, 62 within the cartridge 10.

According to the present invention, a data storage device such as, for example, the disk drive illustrated in FIG. 1, has an optical sensor mounted on either a surface of the disk drive or a surface of the read/write head actuator of the disk drive, and a gray-scale pattern provided on the other of the surface of the actuator or the surface of the disk drive, opposite the optical sensor. The device attached to the surface of the disk drive is stationary, while the device attached to the actuator moves with the actuator as it positions the read/write heads of the disk drive with respect to the storage media of the disk cartridge. As the actuator moves to position the read/write heads, the gray-scale pattern produces an amount of reflected light at the optical sensor that varies with the position of the actuator. The optical sensor produces an output signal proportional to the amount of reflected light received from the gray-scale pattern. The output signal of the optical sensor is therefore indicative of the position of the actuator. As used herein, the term "light" means electromagnetic radiation from any portion of the electromagnetic spectrum, preferably electromagnetic radiation from the ultraviolet, visible or infrared portions of the electromagnetic spectrum, and most preferably, electromagnetic radiation from the infrared portion of the electromagnetic spectrum. As used herein, the term "optical sensor" means any device, component or circuit capable of detecting light reflected from a surface or target, and includes, without limitation, photointerrupters, phototransistors and the like.

Further according to the present invention, a control system receives the position signal from the optical sensor and processes the position signal for purposes of controlling the velocity of the actuator. In a preferred embodiment of the present invention, the control system controls the velocity of the actuator arm during a head loading operation, i.e., as the suspension arms 34 of the actuator move over the load ramp structures 46, 48 to load the read/write heads 36 onto the surfaces of the storage media of a disk cartridge.

Figure 3:
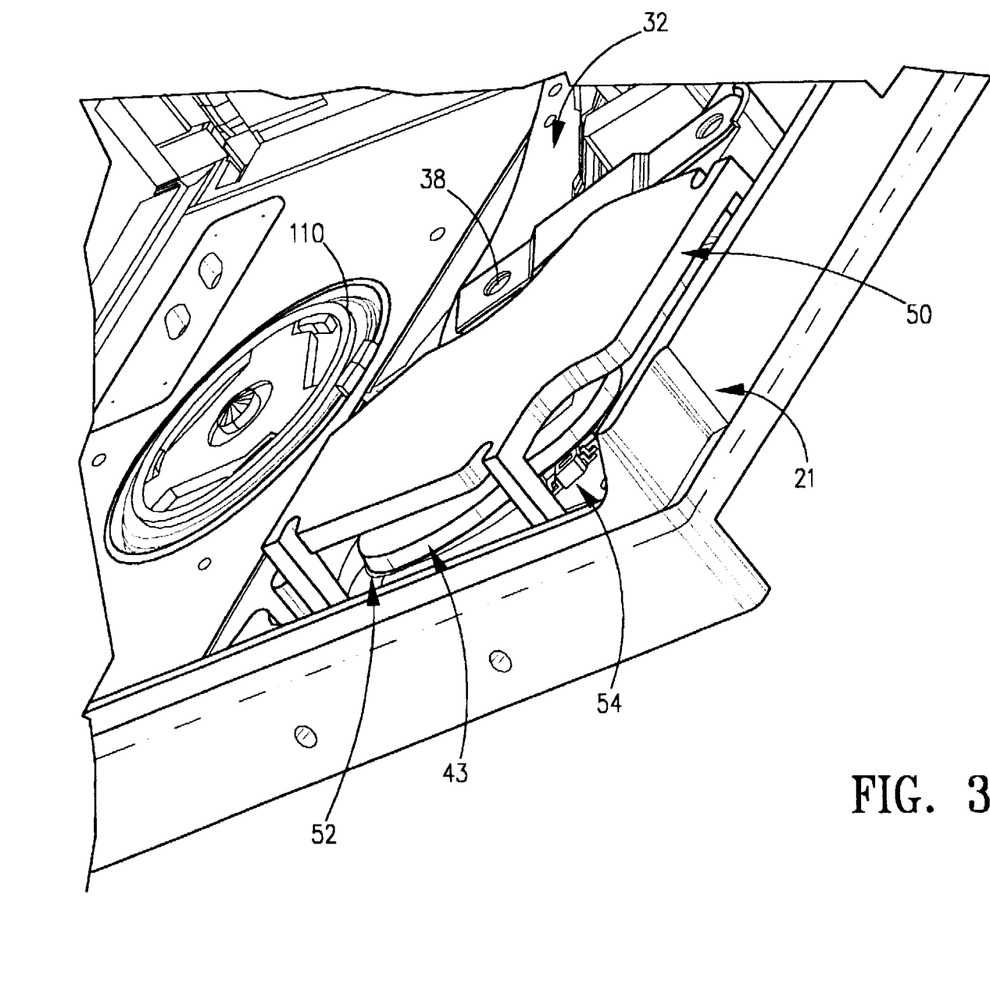
FIG. 3 is an perspective view of a portion of the disk drive of FIG. 1 illustrating the mounting of an optical sensor and a gray-scale pattern in accordance with a preferred embodiment of the present invention.

FIG. 3 is a perspective view of a portion of the disk drive 20 of FIG. 1, illustrating the mounting of an optical sensor 54 and gray-scale pattern 52 in accordance with a preferred embodiment of the present invention, it being understood that the present invention is by no means limited to the embodiment shown. As shown in FIG. 3, in the present embodiment, a gray-scale pattern 52 is attached to the lower surface of the voice coil 43. The voice coil 43 is mounted to a forked member 42 (FIG. 5) at the end of the actuator arm 32. The optical sensor 54 is rigidly mounted to a surface of the disk drive 20 below the voice coil 43. An upper surface of the optical sensor 54 is disposed in facing relation to the gray-scale pattern 52. In the preferred embodiment, the spacing between the upper surface of the optical sensor and the gray-scale pattern 52 is approximately 0.9 millimeters.

Figure 4:
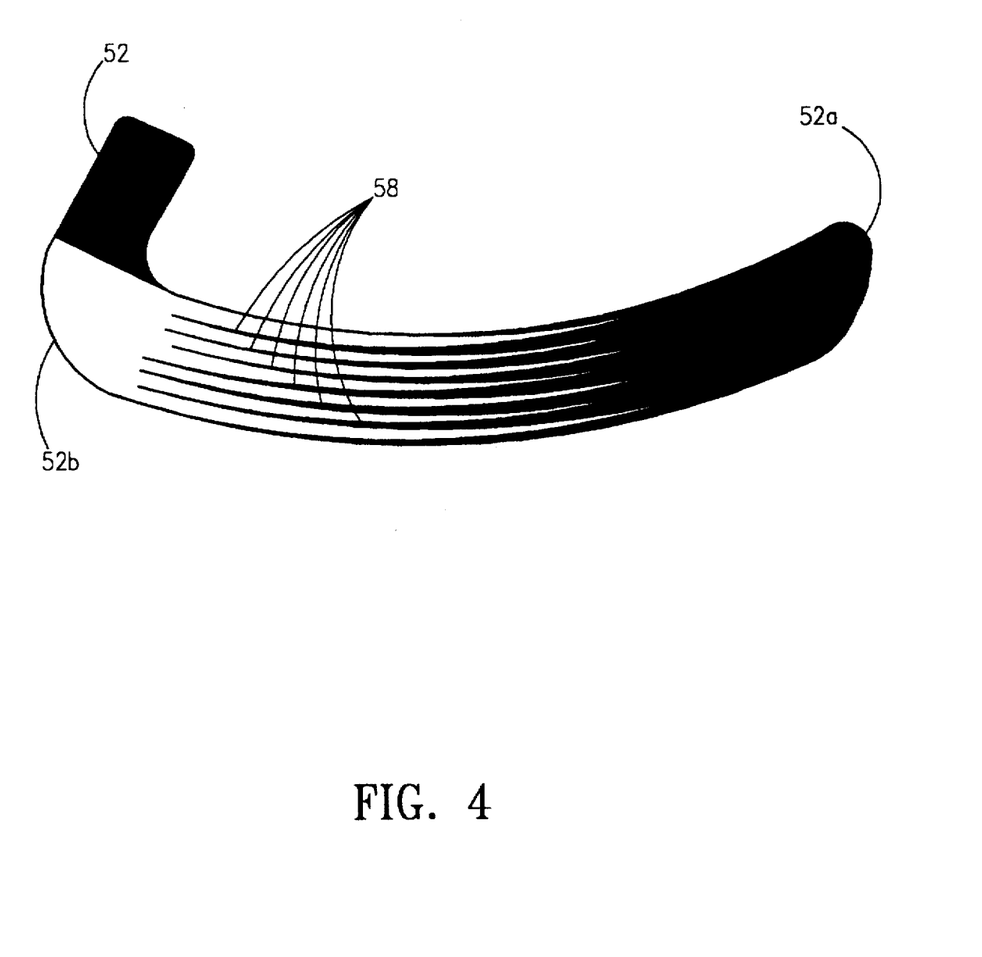
FIG. 4 is a plan view of a gray-scale pattern according to a preferred embodiment of the present invention.

FIG. 4 is an enlarged view of a gray-scale pattern according to the preferred embodiment of the present invention. As used herein, the term "gray-scale pattern" means an optical pattern that varies in reflectivity at different positions over its surface. Varying reflectivity can be achieved by varying shades of gray, or by varying levels of color from light to dark. Preferably, the gray-scale pattern increases in reflectivity, preferably continuously, along one direction. In the preferred embodiment of FIG. 4, the gray-scale pattern 52 comprises a series of gradually thinning lines 58 extending substantially lengthwise across the surface of the pattern. The pattern 52 increases in reflectivity in its lengthwise direction from a first end 52a to a second end 52b. In the present embodiment, the gray scale pattern 52 is printed on a backing material, preferably a photographic polyester film, most preferably a 0.1 millimeter thick polyester photographic film with emulsion on a 0.05 millimeter white polyester. The backing material is then affixed to the coil 43 using an adhesive, with the gray-scale pattern facing the optical sensor 54.

Figure 5:
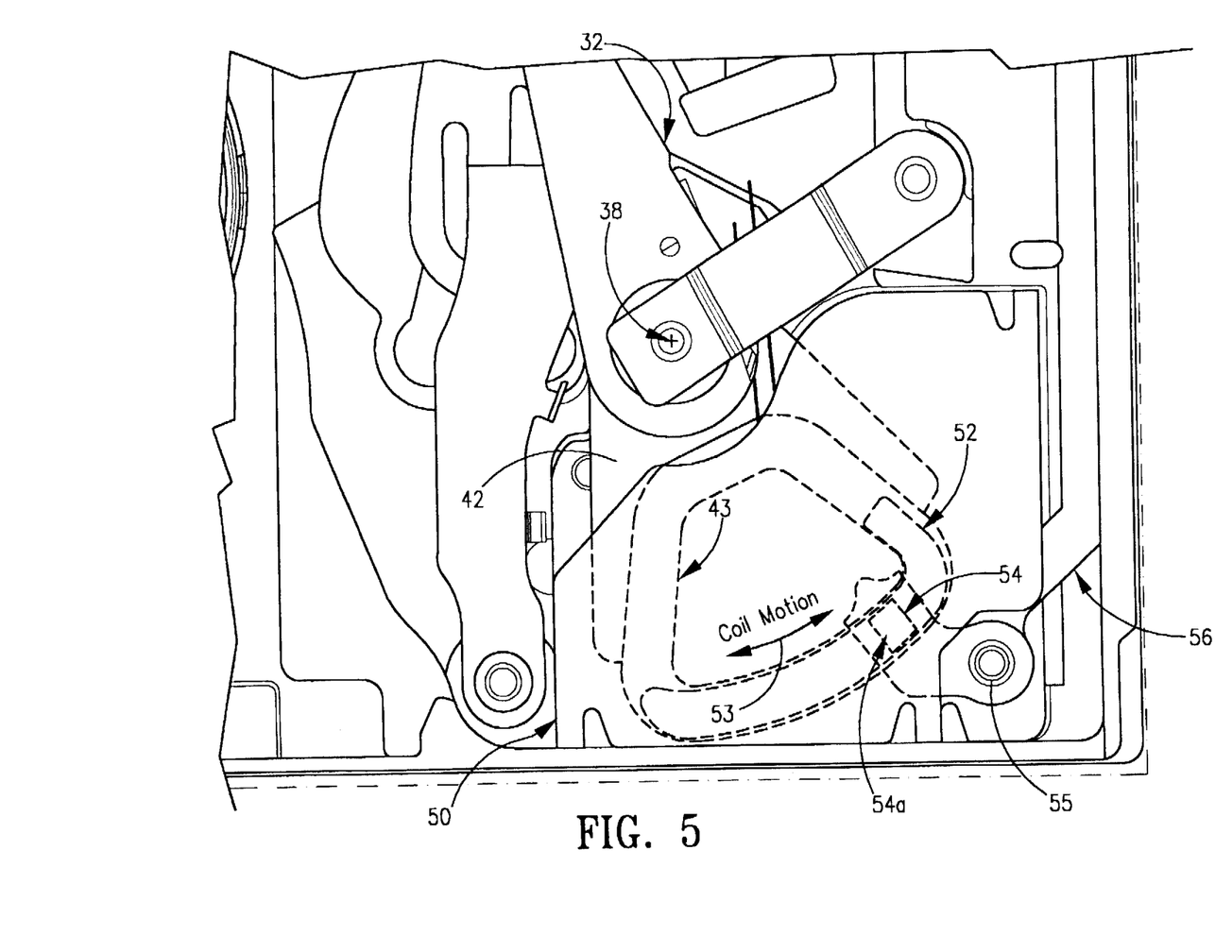
FIG. 5 is a top view of the portion of the disk drive illustrated in FIG. 3.

FIG. 5 is a top view of the portion of the disk drive 20 shown in FIG. 3. As shown in FIG. 5, in the preferred embodiment, the optical sensor 54 is affixed at 55 to a surface of the magnet return path assembly 50. The optical sensor 54 is positioned directly under the surface of the voice coil 43 to which the gray-scale pattern 52 is attached. As the actuator arm 32 rotates about its axis 38, the voice coil member 43 will move in the direction indicated by arrow 53. Thus, as the actuator arm rotates, the gray-scale pattern 52 will move past the optical sensor 54, reflecting a different amount of light on the optical sensor 54 depending upon its position in relation to the optical sensor 54. The optical sensor 54 generates an output signal having a magnitude proportional to the amount of light incident upon the sensor. Due to the precision of the actuator arm mounting 38, the gray-scale pattern 52 will move in a constant plane above the optical sensor 54.

At any point during the rotation of the actuator arm, the amount of light reflected upon the optical sensor 54 from the gray-scale pattern 52 is indicative of the angular position of the actuator arm 32 relative to the optical sensor 54. The output of the optical sensor 54, which is proportional to the amount of light incident upon the sensor, will therefore be indicative of the position of the actuator arm 32. The output signal is transmitted via a conductor 56 to a control system, described hereinafter.

In the preferred embodiment, the control system derives a signal indicative of an estimated velocity of the actuator arm from the position signal output from the optical sensor 54, and processes the estimated velocity signal in accordance with a velocity control algorithm to generate a control signal to drive the actuator 32 and to maintain the velocity of the actuator 32 within a predetermined range. In a most preferred embodiment, the control system selects one of a plurality of different velocity control algorithms for processing the estimated velocity signal, depending upon the position of the actuator arm 32. An estimate of the velocity of the actuator arm can readily be determined from the position signal, i.e., velocity is the rate of change of position. As used herein, the term "control system" means any circuit, device or algorithm, whether implemented in software or hardware, that receives the position signal from the optical sensor 54 and, based thereon, generates a control signal to drive the voice coil of the actuator arm to maintain the velocity of the actuator arm within a predetermined range.

Figure 6A:
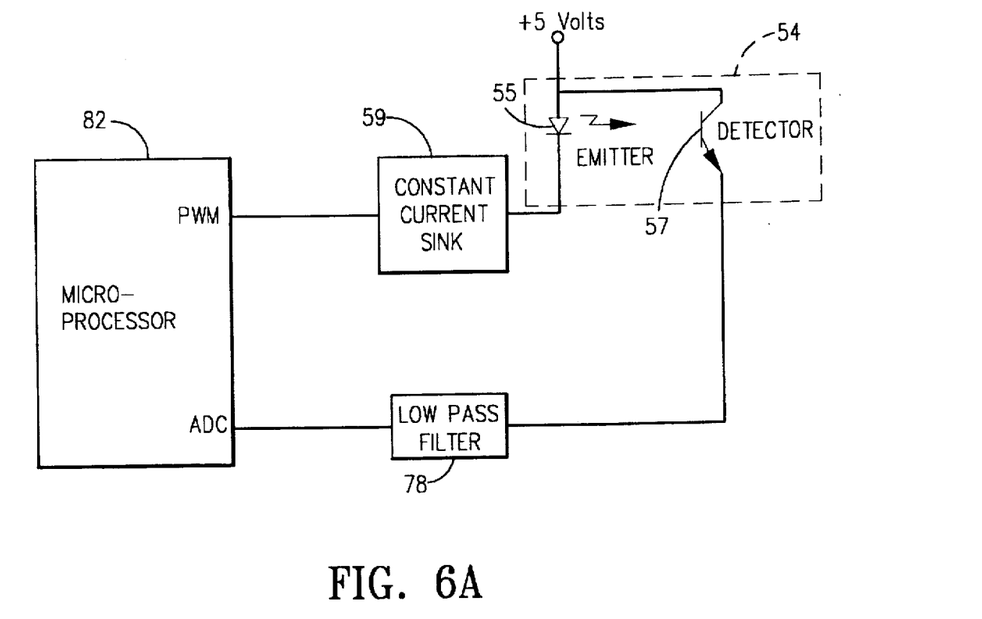
FIG. 6A is a block diagram illustrating the manner in which the optical sensor is electrically connected within the data storage device.

FIG. 6A illustrates the manner in which the optical sensor 54 is electrically connected within the data storage device 20. In the present embodiment, the optical sensor 54 comprises a photointerrupter having an emitter 55 that emits infrared energy (i.e., light) from one half of its upper surface, and a detector 54 (i.e., phototransistor) that detects reflected infrared energy and occupies the other half of the upper surface of the sensor. The emitter 55 and detector 57 portions of the optical sensor 54 face the gray-scale pattern 52. A suitable photointerrupter that can be used to implement the optical sensor 54 is the GP2S27 subminiature photointerrupter available from the Sharp Electronics Corporation.

In the present embodiment, the emitter 55 of the photointerrupter is driven by a constant current sink 59 in order to prevent variations in the power supply voltage (+5V) from effecting the output signal. The constant current sink is turned on and off by a microprocessor 82 through a transistor (not shown).

An emitter that is driven constantly will degrade significantly in a relatively short period. For example, the output of the emitter may degrade as much as seven percent over the first 1000 hours of operation. Such degradation would seriously affect the accuracy of the optical sensor 54. In order to minimize degradation, in the present embodiment, the emitter 55 is driven by the microprocessor 82 only when required. In this manner, the operating time of the emitter 55 is minimized, greatly increasing its life.

The output signal generated by the detector portion 57 of the optical sensor is filtered, in the present embodiment, by a three pole low pass filter 78 in order to provide gain and to eliminate any high frequency components in the signal. The filtered output signal is then provided to an input of the microprocessor 82. In the present embodiment, the microprocessor 82 comprises a Motorola MC68HC16Z1 microprocessor that has an integrated analog-to-digital converter. The analog-to-digital converter is used to sample the output signal of the optical sensor 54. The low-pass filter 78 can be implemented using, for example, an LM358 operational amplifier and associated circuitry.

It is important for proper operation of the present invention that the optical sensor 54 be calibrated so that the magnitude of the output of the detector portion 57 of the sensor 54 is consistent from disk drive to disk drive. Commercially available optical sensors, even when obtained from the same manufacturer, will not have the same output for a given input. From a manufacturing standpoint, it is simply not possible to make each optical sensor perform exactly alike. The calibration scheme of the present invention compensates for these manufacturing variations. Other variations in the performance of the optical sensor 54 will occur from drive to drive due to variations in the whiteness of the gray scale pattern, contaminates and other variables. The calibration scheme of the present invention compensates for all of these variations.

In accordance with the present invention, calibration is achieved by driving the emitter 55 of the optical sensor with a pulse-width modulated signal having a nominal frequency of 32 kilohertz. The aforementioned Motorola microprocessor has an integrated pulse-width modulator that is used for this purpose. When the actuator arm 32 is in a fully parked position, an all-white portion of the gray scale pattern faces the optical sensor 54. Before any movement of the actuator arm 32 occurs, the microprocessor 82 drives the emitter 55 at a nominal frequency (e.g., 32 kHz) and pulse width. The output of the detector 57 is then sampled and its magnitude is compared to a reference value. If the values do not match, the microprocessor 82 varies the pulse width of the driving signal until the output of the detector 57 matches the reference value. This calibration is performed in every disk drive using the same reference value. Once the calibration is complete, the value of the pulse width can be stored in EEPROM for later reference. The optical sensor 54 can be recalibrated any time the actuator arm 32 is moved into its parked position.

Figure 6B:
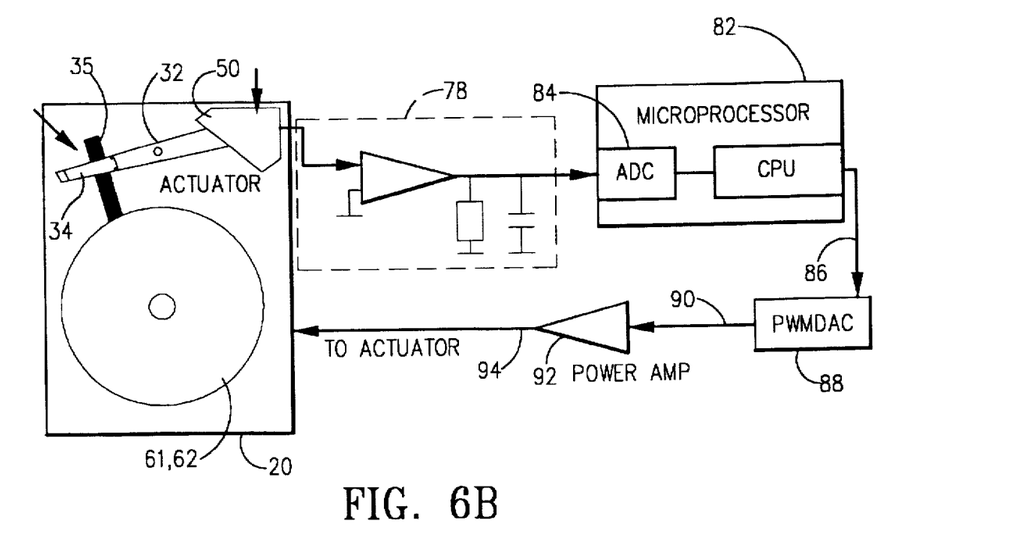
FIG. 6B is a block diagram of a control system for controlling the velocity of a disk drive actuator in accordance with a preferred embodiment of the present invention.

FIG. 6B is a block diagram of one embodiment of a closed-loop control system that can be employed in accordance with the present invention. As shown, the control system comprises the low-pass filter 78 and microprocessor 82 of FIG. 6A. The low-pass filter 78 conditions the output of the optical sensor 54 for input to the integrated analogto-digital converter 84 of the microprocessor 82. The position signal is sampled at a predetermined rate and then processed in accordance with a selected velocity control algorithm implemented by the microprocessor 82. The microprocessor 82 outputs a control signal, which in the present embodiment may take the form of a series of discrete pulses, to a pulse-width-modulation digital-to-analog converter (PWMDAC) 88 via line 86. The PWMDAC 88 converts the pulses of the control signal into an analog control signal and provides the analog control signal to an amplifier 92 via line 90. The amplified control signal drives the voice-coil motor of the disk drive via line 94. As recited in the claims, the PWMDAC 88 and amplifier 92 form a means for applying the control signal to the actuator arm 32.

The magnitude of the control signal will determine the velocity of rotation of the actuator arm 32. In the present embodiment, the velocity control algorithms implemented by the microprocessor 82 are designed to control the velocity of the actuator arm 32 during head loading operations. However, the control system described above, in conjunction with the optical sensor 54 and gray-scale pattern 52 could be used to control the velocity of the actuator arm 32 during other phases of disk drive operation, if desired. Moreover, the optical sensor 54 and gray-scale pattern 52 can also be used, in another application, to obtain rough position information whenever the primary track servo looses control of the position of the read/write heads. This prevents total loss of control of the position of the heads.

Figure 7:
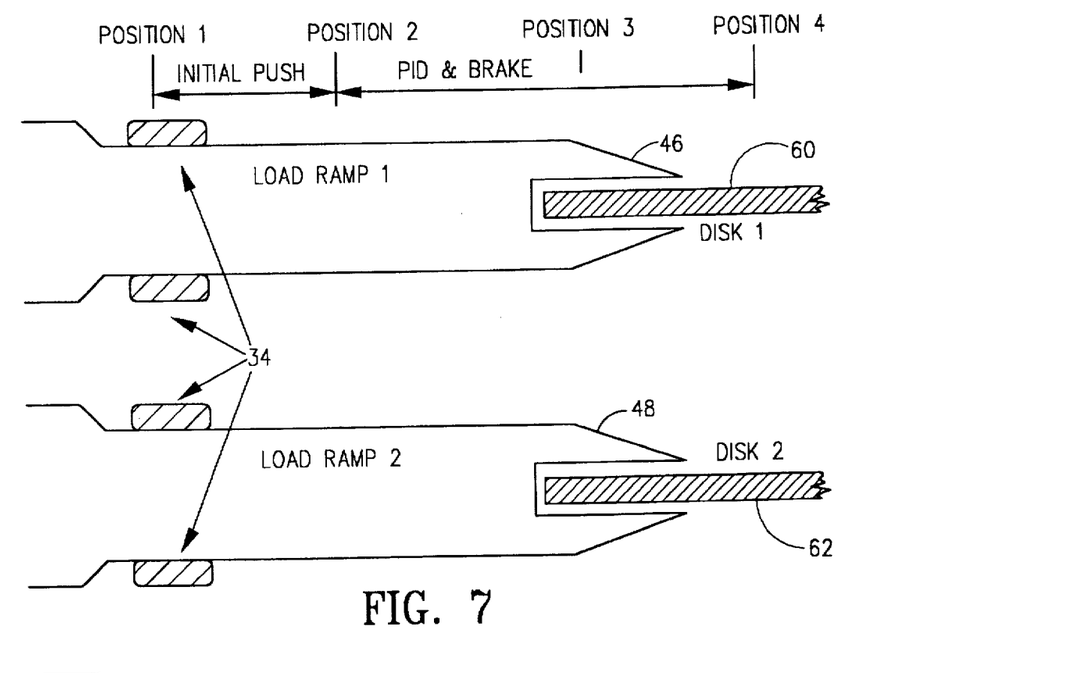
FIG. 7 graphically illustrates various positions of the suspension arms of the actuator of the disk drive of FIG. 1 as the suspension arms move along respective load ramp structures during a head loading operation.

FIG. 7 illustrates various positions of the suspension arms 34 of the actuator arm 32 as they move over the surface of the load ramp structures 46, 48 during a head loading operation. As shown, the suspension arms move along the load ramp structures 46, 48 from "Position 1", through "Position 2" to "Position 3". At "Position 3", the suspension arms 34 begin to move down the respective ramped surfaces of the load ramp structures 46, 48. As the suspension arms 34 move down the ramped surfaces of the load ramp structures 46, 48, the read/write heads 36 (not shown) at the distal ends of the respective suspension arms 34 move toward the respective surfaces of the storage media 60 and 62. When the suspension arms 34 reach "Position 4", the read/write heads 36 are fully loaded onto the surfaces of the media 60, 62. The term "loading" means to bring the read/write heads of the disk drive into normal operating position with respect to the surfaces of the storage media. Fully "loaded" heads do not necessarily contact the surfaces of the storage media. Rather, in many disk drive applications, and in the preferred embodiment of the present invention, the read/write heads of the drive fly closely over, but do not contact, the surface of the rotating media.

Figure 8:
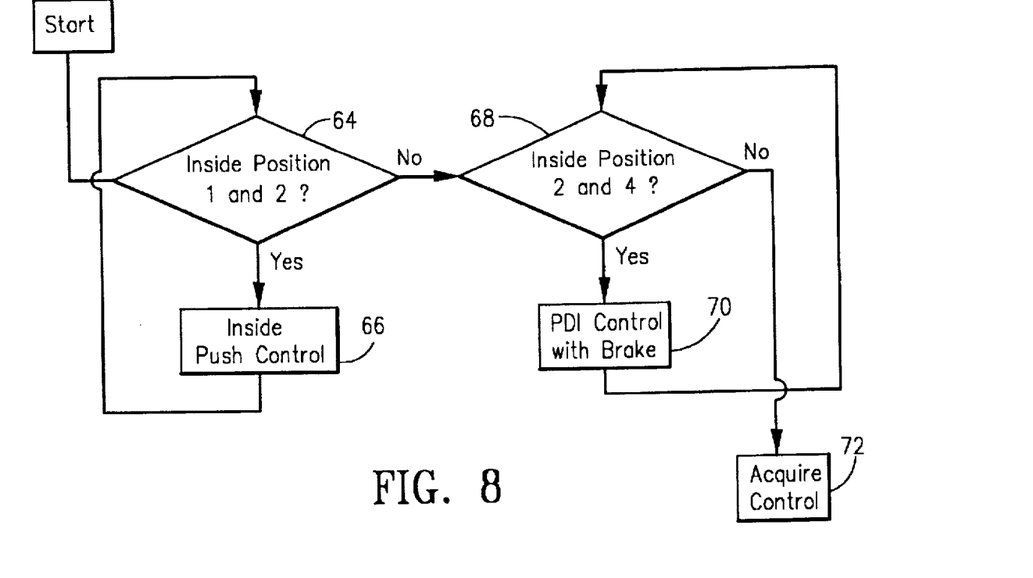
FIG. 8 is a flow chart illustrating a preferred embodiment of a method of controlling the velocity of the actuator of FIG. 1 during the head loading operation illustrated in FIG. 7 in accordance with the present invention.

FIG. 8 illustrates the operation of the control system of FIG. 6B during the head loading sequence illustrated in FIG. 7. As a head loading operation is initiated, microprocessor control passes to step 64 where the microprocessor samples the position signal received from the optical sensor 54 to determine the position of the actuator arm, and hence, the suspension arms 34. If the suspension arms are determined to be between "Position 1" and "Position 2", control passes to step 66 where the microprocessor 82 begins processing the incoming samples of the position signal in accordance with a first velocity control algorithm. In the present embodiment, the first velocity control algorithm, described hereinafter in greater detail and referred to herein as the "initial push control", implements a bang-bang velocity control technique with high control authority that is designed to overcome the static friction, or stiction, between the surfaces of the load ramp structures 46, 48 and the suspension arms 34 of the actuator arm. The microprocessor 82 continues to monitor the position of the actuator arm 32 via the incoming position signal and continues the initial push control of the actuator arm 32 until the suspension arms move past "Position 2".

As the suspension arms 34 move past position 2, control passes to step 68 where the microprocessor switches to a second velocity control algorithm that, in the preferred embodiment, comprises a closed loop velocity PID compensation and a nonlinear braking control. The PID compensation maintains the velocity of the suspension arms within a predetermined range. However, since the PID compensation is not able to respond to certain non-linearities and external disturbances in the system, the non-linear braking control takes over when the velocity of the heads reaches a predetermined threshold. Both the PID compensation and non-linear braking control are described below in greater detail.

Once the suspension arms 34 reach "Position 4", the head loading operation is complete, and control passes to step 72 where the microprocessor initiates acquisition of the servo track information on the surfaces of the storage media 60, 62.

Figure 9:
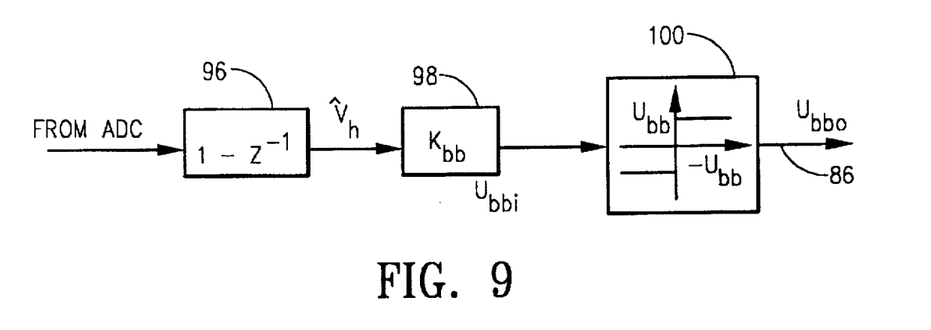
FIG. 9 illustrates a first velocity control algorithm employed by the control system of FIG. 6, when the suspension arms are between positions 1 and 2 of FIG. 7.
Figure 10:
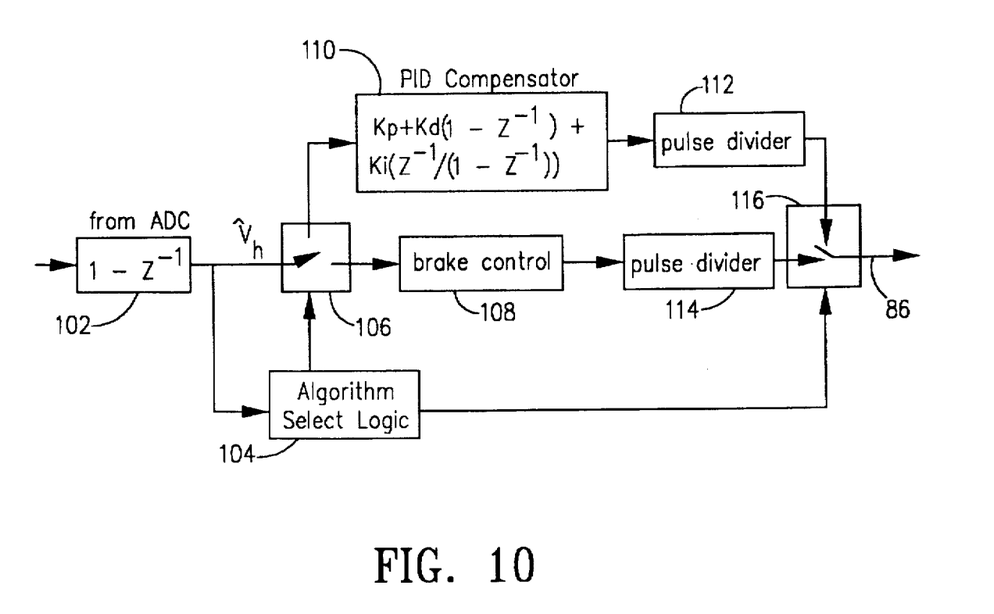
FIG. 10 illustrates a second velocity control algorithm employed by the control system of FIG. 6, when the suspension arms are between positions 2 and 4 of FIG. 7.

FIG. 9 graphically illustrates the bang-bang velocity control technique of the initial push control algorithm, i.e., the first velocity control algorithm. The initial push control algorithm is implemented as an interrupt driven real-time program executed by the microprocessor 82. At the beginning of each interrupt service function of the microprocessor 82, the optical sensor's output, which is proportional to the position of the actuator arm 32, is sampled by the microprocessor 82. A discrete differentiation is conducted (block 96) to obtain an estimate of the velocity, $V_h$. This value is then multiplied by a gain factor, $K_{bb}$ (block 98). The result, $U_{bbi}$, is then compared to a switch function depicted at block 100. The output of the switch function, $U_{bbo}$, which defines a control signal for driving the actuator 32, is then output to the actuator power amplifier 92 though the PWMDAC 88. According to the switch function of the present embodiment, $U_{bbo} = +U_{bb}$, if $U_{bbi} > U_{bb}$;

$U_{bbo} = 0$, if $U_{bbi} = 0$; and $U_{bbo} = -U_{bb}$, if $U_{bbi} < U_{bb}$.

While the initial push control algorithm is implemented in software and executed by the microprocessor 82, it is understood that the present invention is by no means limited thereto. For example, the initial push control algorithm could be implemented using discrete circuitry. Moreover, the present invention is not limited to the particular algorithm described above. Rather, any suitable control algorithm capable of overcoming the static friction between the suspension arms and the surface of the head load structures can be employed during this phase of the head loading operation.

FIG. 9 graphically illustrates the second velocity control algorithm that is employed by the control system when the suspension arms 34 are determined to be between "Position 2" and "Position 4" (FIG. 7). This second velocity control algorithm is also an interrupt driven real-time program that is executed by the microprocessor 82. As mentioned above, in the present embodiment, the second velocity control algorithm implements both a PID compensation algorithm and a nonlinear braking control algorithm, one of which is selected at any given instant based on the estimated velocity of the actuator arm 32.

At the beginning of each interrupt service function of the microprocessor 82, the optical sensor's output, which is proportional to the position of the actuator arm 32, is sampled by the microprocessor 82. A discrete differentiation is conducted (block 102) to obtain an estimate of the velocity, $V_h$. This value is then compared to a velocity threshold, $V_{max}$, at block 106. If the estimated velocity $V_h$ is less than or equal to the velocity threshold $V_{max}$ (i.e., $V_h \leq V_{max}$), then the estimated velocity samples are processed in accordance with the PID compensation algorithm. Algorithm select logic represented by block 104 selects the appropriate control signal output via block 116. In the present embodiment, the PID compensation in discrete form is implemented as follows:

$$U_{PID}=K_p \times V_h[0]+K_d \times (V_h[0]-V_h[1])+K_i \times VI[0],$$

where $VI[0]=VI[1]+V_h[0]$ is the integral of the velocity estimate; $V_h[0]$ and $V_h[1]$ represent the current and the previous velocity estimates, respectively; $K_p$, $K_i$ and $K_d$ are the proportional, integral, and derivative gain factors; and $U_{PID}$ is the control signal output of the PID compensation algorithm. In order to overcome the friction between the suspension arms 34 and the surfaces of the load ramp structures 46 and 48, $U_{PID}$ is divided into n pulses by a pulse divider 112. The summation of these pulses has the equivalent energy of $U_{PID}$. The pulses are then transmitted to the PWMDAC 88 via line 86 and are realized by the PWMDAC 88 within a sample period.

When suspension arms 34 approach the end of the load ramp structures 46, 48, a braking force may be needed to replace the PID compensation due to the severity of external disturbances and non-linearities. Accordingly, if the estimated velocity, $V_h$, exceeds the velocity threshold, $V_{max}$ (i.e., $V_h>V_{max}$), the braking control algorithm 108 is selected via selection logic 104. The braking control algorithm, in combination with pulse divider 114, outputs a number of pulses with a constant amplitude. These pulses represent the control signal for driving the actuator. The pulses are transmitted to the PWMDAC 88 via line 86 and are realized by the PWMDAC 88. The braking control will continue k samples until the velocity estimate again satisfies the velocity threshold, i.e., $V_h \leq V_{max}$, at which point PID compensation will resume. It is understood that, as with the first control algorithm, the second control algorithm is not limited to the particular embodiment described above. Rather, any suitable algorithm for controlling the velocity of the actuator arm within a predetermined range can be employed without departing from the spirit and scope of the present invention. Moreover, the second velocity control algorithm can be implemented using discrete circuitry and is not limited to the software implementation described above.

As the foregoing illustrates, the present invention is directed to a data storage device having apparatus for controlling the velocity of an actuator arm. The apparatus comprises an optical sensor, a gray-scale pattern and a control system. The optical sensor and gray-scale pattern provide a low-cost, efficient means of generating a signal indicative of the position of the actuator arm, from which the control system can derive a velocity estimate and control the velocity of the actuator arm. The present invention is particularly well suited for controlling the velocity of the actuator arm during a head loading operation. It is understood that changes may be made to the embodiments described above without departing from the broad inventive concepts thereof. Accordingly, the present invention is not limited to the particular embodiments disclosed, but is intended to cover all modifications that are within the spirit and scope of the invention as defined by the appended claims.

What is claimed is:

1. A data storage device for reading and writing information to and from a storage medium, said data storage device having an actuator for moving a read/write head over a surface of the storage medium, said data storage device further comprising:

an optical sensor mounted on one of a surface of the data storage device and a surface of the actuator;

a gray-scale pattern provided on the other of said surface of the data storage device and said surface of the actuator opposite said optical sensor, said gray scale pattern providing an amount of reflected light at said optical sensor that varies with the position of the actuator, said optical sensor receiving said reflected light and generating therefrom an output signal indicative of the position of said actuator; and a control system responsive to the position signal output from said optical sensor for controlling a velocity of said actuator.

2. The data storage device of claim 1 wherein the optical sensor is mounted on a surface of said data storage device and wherein the gray-scale pattern is provided on a surface of said actuator.

3. The data storage device of claim 1 wherein the actuator comprises a rotary arm voice-coil actuator having a rotatably mounted arm with a coil attached at one end thereof, and wherein said gray-scale pattern is provided on a surface of said coil.

4. The data storage device of claim 3 wherein said optical sensor is mounted within a magnet return path assembly of the data storage device, opposite the gray-scale pattern provided on said coil.

5. The data storage device of claim 1 wherein said gray scale pattern varies in reflectivity at different positions on said pattern.

6. The data storage device of claim 5 wherein said gray scale pattern increases in reflectivity continuously in a lengthwise direction of said pattern.

7. The data storage device of claim 6 wherein said gray scale pattern comprises a plurality of gradually thinning lines extending substantially lengthwise across said pattern.

8. The data storage device of claim 1 wherein said gray scale pattern is printed on a backing material that is affixed to said other of said surface of the data storage device and said surface of the actuator.

9. The data storage device of claim 8 wherein said backing material comprises a photographic polyester film.

10. The data storage device of claim 1 wherein said control system comprises a closed-loop control system.

11. The data storage device of claim 1 wherein said control system derives a signal indicative of an estimated velocity of the actuator from the position signal output from the optical sensor and processes the estimated velocity signal in accordance with a velocity control algorithm to generate a control signal to drive the actuator and maintain the velocity of the actuator within a predetermined range.

12. The data storage device of claim 11 wherein said control system selects one of a plurality of different velocity control algorithms for controlling the velocity of the actuator depending upon the position of the actuator as indicated by the output signal of said optical sensor.

13. The data storage device of claim 12 wherein said plurality of different control algorithms comprises an initial push control algorithm, a proportional-integral-derivative compensation algorithm, and a braking control algorithm.

14. The data storage device of claim 1 wherein said control system comprises:

an analog-to-digital converter electrically coupled to said optical sensor for sampling the output signal of said optical sensor;

means for differentiating successive samples of the output signal of said optical sensor to produce a signal indicative of an estimated velocity of said actuator;

means for processing the estimated velocity signal in accordance with a velocity control algorithm to generate a control signal to drive the actuator and maintain the velocity of the actuator within a predetermined range; and means for applying said control signal to said actuator.

15. The data storage device of claim 14 wherein said means for applying said control signal comprises a pulse-width-modulation digital-to-analog converter (PWMDAC) and an amplifier.

16. The data storage device of claim 14 wherein said means for differentiating and said means for processing comprise a microprocessor.

17. The data storage device of claim 1 wherein the optical sensor comprises a photointerrupter having an emitter that illuminates the gray-scale pattern and a detector that detects light reflected from the gray-scale pattern.

18. The data storage device of claim 17 wherein the emitter of the optical sensor is driven by a pulse-width modulated signal, the pulse width of which is adjusted to compensate for variations in the output of the detector.

19. A data storage device of the type that receives a removable cartridge containing a storage medium, said data storage device having an actuator for moving a read/write head over a surface of the storage medium, said data storage device further comprising:

an optical sensor mounted on a surface of the data storage device;

a gray-scale pattern provided on a surface of the actuator opposite said optical sensor, said gray scale pattern providing an amount of reflected light at said optical sensor that varies with the position of the actuator, said optical sensor receiving said reflected light and generating therefrom an output signal indicative of the position of said actuator; and a control system responsive to the position signal output from said optical sensor for controlling a velocity of said actuator.

20. The data storage device of claim 19 wherein the actuator comprises a rotary arm voice-coil actuator having a rotatably mounted arm with a coil attached at one end thereof, and wherein said gray-scale pattern is provided on a surface of said coil.

21. The data storage device of claim 20 wherein said optical sensor is mounted within a magnet return path assembly of the data storage device, opposite the gray-scale pattern provided on said coil.

22. The data storage device of claim 19 wherein said gray-scale pattern varies in reflectivity at different position on said pattern.

23. The data storage device of claim 22 wherein said gray scale pattern increases in reflectivity continuously in a lengthwise direction of said pattern.

24. The data storage device of claim 23 wherein said gray scale pattern comprises a plurality of gradually thinning lines extending substantially lengthwise across said pattern.

25. The data storage device of claim 19 wherein said gray scale pattern is printed on a backing material that is affixed to the surface of the actuator.

26. The data storage device of claim 25 wherein said backing material comprises a photographic polyester film.

27. The data storage device of claim 19 wherein said control system comprises a closed-loop control system.

28. The data storage device of claim 19 wherein said control system derives a signal indicative of an estimated velocity of the actuator from the position signal output from the optical sensor and processes the velocity signal in accordance with a velocity control algorithm to generate a control signal to drive the actuator and maintain the velocity of the actuator within a predetermined range.

29. The data storage device of claim 28 wherein said control system selects one of a plurality of different velocity control algorithms for controlling the velocity of the actuator depending upon the position of the actuator as indicated by the output signal of said optical sensor.

30. The data storage device of claim 29 wherein said plurality of different control algorithms comprises a initial push control algorithm, a proportional-integral-derivative compensation algorithm, and a braking control algorithm.

31. The data storage device of claim 19 wherein said control system comprises:

an analog-to-digital converter electrically coupled to said optical sensor for sampling the output signal of said optical sensor;

means for differentiating successive samples of the output signal of said optical sensor to produce a signal indicative of an estimated velocity of said actuator;

means for processing the estimated velocity signal in accordance with a velocity control algorithm to generate a control signal to drive the actuator and maintain the velocity of the actuator within a predetermined range; and means for applying said control signal to said actuator.

32. The data storage device of claim 31 wherein said means for applying said control signal comprises a pulse-width-modulation digital-to-analog converter (PWMDAC) and an amplifier.

33. The data storage device of claim 31 wherein said means for differentiating and said means for processing comprise a microprocessor.

34. The data storage device of claim 19 wherein the optical sensor comprises a photointerrupter having an emitter that illuminates the gray-scale pattern and a detector that detects light reflected from the gray-scale pattern.

35. The data storage device of claim 34 wherein the emitter of the optical sensor is driven by a pulse-width modulated signal, the pulse width of which is adjusted to compensate for variations in the output of the detector.

36. Apparatus for controlling the velocity of an actuator that carries a read/write head of a data storage device over a surface of a storage medium, said apparatus comprising:

an optical sensor mounted on one of a surface of the data storage device and a surface of the actuator;

a gray-scale pattern provided on the other of said surface of the data storage device and said surface of the actuator opposite said optical sensor, said gray scale pattern providing an amount of reflected light at said optical sensor that varies with the position of the actuator, said optical sensor receiving said reflected light and generating therefrom an output signal indicative of the position of said actuator; and a control system responsive to the position signal output from said optical sensor for controlling a velocity of said actuator.

37. The apparatus of claim 36 wherein the optical sensor is mounted on a surface of said data storage device and wherein the gray-scale pattern is provided on a surface of said actuator.

38. The apparatus of claim 36 wherein the actuator comprises a rotary arm voice-coil actuator having a rotatably mounted arm with a coil attached at one end thereof, and wherein said gray-scale pattern is provided on a surface of said coil.

39. The apparatus of claim 38 wherein said optical sensor is mounted within a magnet return path assembly of the data storage device, opposite the gray-scale pattern provided on said coil.

40. The apparatus of claim 36 wherein said gray scale pattern varies in reflectivity at different positions on said pattern.

41. The apparatus of claim 40 wherein said gray scale pattern increases in reflectivity continuously in a lengthwise direction of said pattern.

42. The apparatus of claim 41 wherein said gray scale pattern comprises a plurality of gradually thinning lines extending substantially lengthwise across said pattern.

43. The apparatus of claim 36 wherein said gray scale pattern is printed on a backing material that is affixed to said other of said surface of the data storage device and said surface of the actuator.

44. The apparatus of claim 43 wherein said backing material comprises a photographic polyester film.

45. The apparatus of claim 36 wherein said control system comprises a closed-loop control system.

46. The apparatus of claim 36 wherein said control system derives a signal indicative of an estimated velocity of the actuator from the position signal output from the optical sensor and processes the velocity signal in accordance with a velocity control algorithm to generate a control signal to drive the actuator and maintain the velocity of the actuator within a predetermined range.

47. The apparatus of claim 46 wherein said control system selects one of a plurality of different velocity control algorithms for controlling the velocity of the actuator depending upon the position of the actuator as indicated by the output signal of said optical sensor.

48. The apparatus of claim 47 wherein said plurality of different control algorithms comprises an initial push control algorithm, a proportional-integral-derivative compensation algorithm, and a braking control algorithm.

49. The apparatus of claim 36 wherein said control system comprises:

an analog-to-digital converter electrically coupled to said optical sensor for sampling the output signal of said optical sensor;

means for differentiating successive samples of the output signal of said optical sensor to produce a signal indicative of an estimated velocity of said actuator;

means for processing the estimated velocity signal in accordance with a velocity control algorithm to generate a control signal to drive the actuator and maintain the velocity of the actuator within a predetermined range; and means for applying said control signal to said actuator.

50. The apparatus of claim 49 wherein said means for applying said control signal comprises a pulse-width-modulation digital-to-analog converter (PWMDAC) and an amplifier.

51. The apparatus of claim 49 wherein said means for differentiating and said means for processing comprise a microprocessor.

52. The data storage device of claim 36 wherein the optical sensor comprises a photointerrupter having an emitter that illuminates the gray-scale pattern and a detector that detects light reflected from the gray-scale pattern.

53. The data storage device of claim 52 wherein the emitter of the optical sensor is driven by a pulse-width modulated signal, the pulse width of which is adjusted to compensate for variations in the output of the detector.

* * * * *